Jan. 23, 1973

S. G. LAMMERS ET AL    3,712,872

COMPOSITION COMPRISING ACRYLONITRILE-BUTADIENE-STYRENE
POLYMER BEADS COATED WITH NN' ETHYLENE BIS STEARAMIDE

Filed Jan. 3, 1969

INVENTORS
SIDNEY G. LAMMERS
ANTHONY N. CIARLONE
FREDERICK E. CARROCK

BY *[signature]*

ATTORNEY

United States Patent Office 3,712,872
Patented Jan. 23, 1973

3,712,872
COMPOSITION COMPRISING ACRYLONITRILE-BUTADIENE-STYRENE POLYMER BEADS COATED WITH NN' ETHYLENE BIS STEARAMIDE
Sidney G. Lammers, Liverpool, N.Y., and Anthony N. Ciarlone, Clark, and Frederick E. Carrock, Paramus, N.J., assignors to Rexall Drug and Chemical Company, Los Angeles, Calif.
Filed Jan. 3, 1969, Ser. No. 788,805
Int. Cl. B28b 1/02; B29c 5/04; C08f 21/04
U.S. Cl. 260—23.7 N    3 Claims

ABSTRACT OF THE DISCLOSURE

A composition including acrylonitrile-butadiene-styrene polymer particles preferably in bead form coated with 0.25% to 2.00% by weight of either NN' ethylene bis stearamide or calcium stearate. The particle size of the beads is preferably smaller than 600 microns. The composition is useful in rotationally casting articles from acrylonitrile-butadiene-styrene polymers.

BACKGROUND OF THE INVENTION

(1) Field of invention

This invention relates to a composition comprising acrylonitrile-butadiene-styrene polymer particles or beads. The composition is particularly useful as a novel raw material in a rotational casting process. The articles cast from the composition incorporating acrylonitrile-butadiene-styrene (ABS) polymer particles or beads have good adhesion for finishes and good resistance to solvents commonly used in the furniture industry. The articles also have a smooth surface, good mold reproduction and the ability to withstand nailing, drilling and sawing.

(2) Description of the prior art

In rotational casting the article is formed inside a closed mold. The raw material in either the powder or liquid state is loaded into the mold. The loaded mold is then placed in a heated chamber while it is rotated. During the time the loaded mold is in the heated chamber the raw material melts and covers the internal surface of the mold. The mold is then removed from the heated chamber and placed in a cooling chamber where the raw material solidifies on the internal surface of the mold. The mold is then opened and the article is removed. In rotational casting the mold is preferably rotated about two axes. The rotation is at a low speed generally from about 2 to 40 r.p.m. along the minor axis and from 2 to 12 r.p.m. along the major axis. A 4 to 1 rotation ratio of the rotating speed on the minor axis to the rotating speed on the major axis is common. Many machines for rotational casting permit variable ratios. The art of rotational casting is old and it is only during the last decade that technological refinements have been made to a point where rotational casting is used in a sizable portion of the plastics molding industry and is rapidly growing.

Rotational casting has specific advantages in that a plastic part can be formed in almost any shape and in almost any reasonable size. Items as light as ⅛ of an ounce and at least as heavy as 250 pounds have been rotationally cast. Objects are made with uniform wall thickness and hollow objects can be made without seams through the use of rotational casting. Machines are available that will cast objects at least as large as 448 cubic feet. Household goods, parts for automobiles, parts for appliances, tanks, toys, boat parts, tires and mannequins have all been rotationally cast. Machines are available which will cast items such as entire boats, beer kegs, shower stalls, refrigerator doors and telephone booths.

Many materials have been successfully molded. Among these are butyrates, polyethylenes, ethylene vinyl acetates, impact polystyrene, polypropylenes, propionates and plastisols. Since rotational casting is fairly new to the industry all possible materials have not been successfully used. One of the polymers that has caused difficulty in rotational casting is acrylonitrile-butadiene-styrene copolymers (ABS). Attempts at rotationally casting ABS have been previously unsuccessful. The surface of the rotationally cast article from prior art ABS materials has a tendency to become brittle and the ABS does not reach all of the intricate features of the rotational mold. Other properties of the ABS have been adversely affected and the melted ABS has a tendency to form thick portions in the walls of the molded article. This thickening is known as "puddling." The surface of articles rotationally cast from ABS has previously been porous.

BRIEF DESCRIPTION OF THE INVENTION

Figure 1:
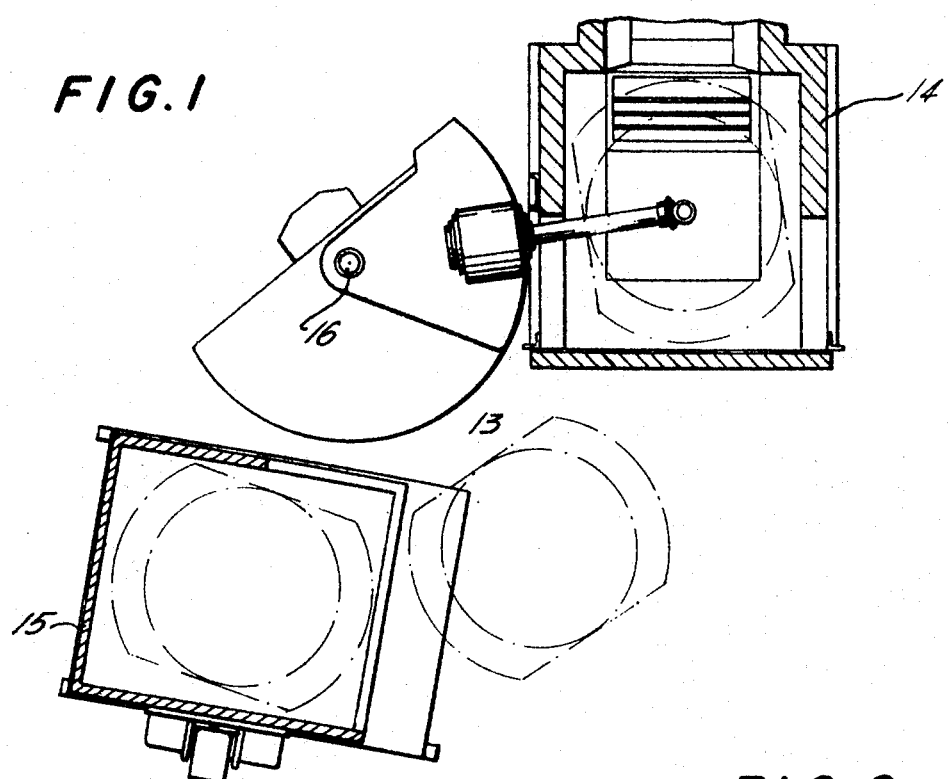
FIG. 1 is a schematic diagram of the complete rotational casting apparatus.

This invention relates to a composition comprising acrylonitrile-butadiene-styrene polymer particles or beads. A composition has been discovered that is particularly useful as a novel raw material in a rotational casting process. The particle size of the ABS polymer should be smaller than about 600 microns, the particle shape should preferably be spherical, and the ABS particles should be coated with either calcium stearate or NN' ethylene bis stearamide.

An object of this invention is to provide an ABS composition which can be successfully used in rotational casting.

It is a further object of this invention to prepare a rotationally cast article having good adhesion for finishes used in the furniture industry.

Another object of this invention is to prepare a rotationally cast article having resistance to most of the solvents used in the furniture industry.

Another object of this invention is to prepare a rotationally cast article which can be drilled, nailed and sawed.

Another object of this invention is to provide an ABS composition which can be successfully rotationally cast at lower processing temperatures.

Another object of this invention is to prepare a rotationally cast article having good surface characteristics, uniform wall thickness, and detailed mold reproduction.

Further objects of this invention will become apparent in the incorporated drawings, text and examples.

PREFERRED EMBODIMENT

This invention involves rotational casting of articles from a composition comprising acrylonitrile-butadiene-styrene polymers. The articles cast from ABS have an impact resistance superior to articles rotationally cast from polymers used in the prior art. Articles rotationally cast from ABS also have adhesion for finishes commonly used in the furniture industry, resistance to solvents commonly used in the furniture industry and the ability to be nailed, drilled, and sawed. It has now been discovered that certain compositions comprising ABS polymer beads can be successfully rotationally cast. It is primarily the discovery of specific properties of the ABS composition that has made it possible to successfully rotationally cast ABS.

Some of the properties and components of the proper composition which individually or in combination improve the properties of articles rotationally cast from ABS are as follows:

(a) It has been discovered that the particle size of ABS should be smaller than about 600 microns in order to obtain a satisfactory surface and uniform wall thickness in the cast article.

(b) It has been discovered that the particle shape should preferably be spherical although particles having random shape such as the particle shapes obtained by grinding polymer beads in a ball mill can be used. It has been discovered that these spherical particles should preferably be beads prepared substantially in accordance with the process set forth in the United Kingdom Pat. 1,020,176. Spherical particles seem to give better fill in the corners of the mold, improved surface characteristics and reduced "puddling."

(c) It has been discovered that the ABS polymer preferably should have a melt flow of from about 8 to about 15 grams per 10 minutes at 230° C. and 5,000 grams of force using ASTM method D-1238-65T.

(d) In order to assure good flow of the ABS composition over the surface of the mold it has been discovered that the ABS particles should be coated with calcium stearate or NN' ethylene bis stearamide either before or after introducing the particles into the mold.

The use of from about 0.25% to 3% calcium stearate seems to act as a lubricant for the ABS beads and results in a smooth detailed surface on the rotationally cast ABS article. The use of calcium stearate permits production of rotationally cast ABS articles at oven temperatures as low as 520° F. as compared with oven temperatures of about 600° F. which would otherwise be necessary. Calcium stearate, however, has a slight tendency to add color to the finished article.

It has also been discovered that from about 0.25% to 2% NN' ethylene bis stearamide coated onto the ABS beads seems to act as a lubricant and also assists in giving a smooth detailed surface on the rotationally cast ABS article. NN' ethylene bis stearamide has a slight tendency to embrittle the article.

Calcium stearate and NN' ethylene bis stearamide seems to be superior to other lubricants which have been tried in the rotational casting of ABS compositions.

An ABS polymer which has been successfully incorporated into the composition is a copolymer of 6 to 11% butadiene, 28 to 32% acrylonitrile and from 57 to 66% styrene.

The steps in the process for rotationally casting ABS comprise:

(a) Loading lubricant and a composition comprising ABS particles having a particle size smaller than about 600 microns into a mold. The lubricant used should be from 0.25% to 2% by weight of either calcium stearate or NN' ethylene bis stearamide.

(b) Heating the lubricant and composition while the mold is being rotated and until the composition is distributed evenly upon the walls of the mold.

(c) Cooling the composition until the composition congeals upon the surface of the walls of the mold forming an ABS article.

(d) The mold is then opened and the article cast from the ABS composition its removed.

The order of loading, heating and rotating is not important as long as the composition is evenly distributed upon the walls of the mold.

Figure 3:
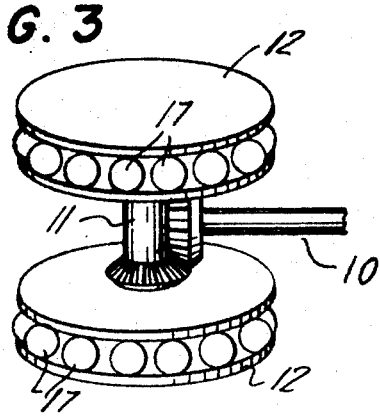
FIG. 3 is a perspective view of the rotational molding areas showing the individual mold compartments and the rotating axes.
Figure 2:
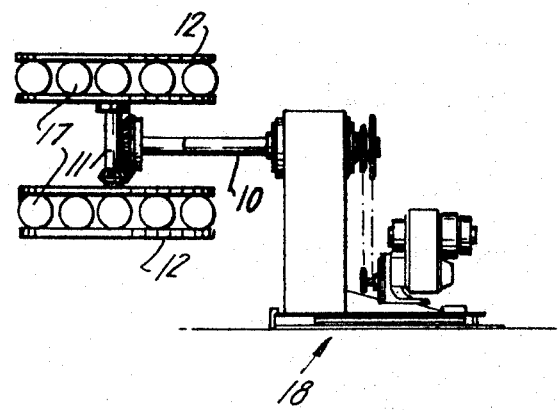
FIG. 2 is an elevational view of the drive mechanism, the rotational molding areas, and the rotating axes.
Figure 4:
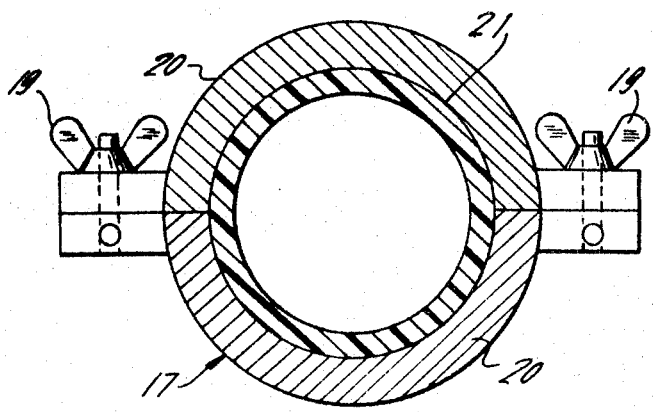
FIG. 4 is a plan cross-sectional view of an individual mold.

In the preferred embodiment of the invention a composition including acrylonitrile-butadiene-styrene polymer beads is loaded into individual mold 17 as shown in FIGS. 2, 3 and 4. The composition includes ABS polymer beads coated with from 0.25% to about 2% of either NN' ethylene bis stearamide or calcium stearate. The particle size of the beads is preferably smaller than 600 microns. The mold is opened to receive the composition containing ABS polymer by loosening wing nut 19 and separating mold halves 20. The composition is introduced into one of the mold halves and the other mold half is placed on and secured to the loaded mold half. Individual mold 17 is then inserted into mold area 12 while area 12 is located at loading station 13 as shown in FIG. 1. Individual mold 17 is then rotated biaxially by means of drive mechanism 18, minor axis arm 11 and major axis arm 10. The rotation mold is then moved about rotating hub 16 to oven station 14. During the time the mold is rotated in the oven the ABS polymer composition is distributed evenly upon the walls of individual mold 17 forming ABS cover 21. The mold is then moved from oven station 14 to cooling station 15 about rotating hub 16. The rotating mold is then cooled by means of a fine water spray in cooling station 15 until the ABS composition congeals on the interior surface of the mold. The mold is then moved from cooling station 15 to loading station 16 and individual mold 17 is opened and the rotationally cast ABS article is removed.

An ABS polymer which is recommended has the following properties:

| Property | ASTM test | Unit | Value |
| --- | --- | --- | --- |
| Impact strength, Izod, notched at 73° F. | D256 | Ft. lbs./in. of notch (⅛" bar). | 1.5 |
| −40° F. | | | 0.9 |
| Thermal properties: | | | |
| Heat deflection temp. at 264 p.s.i. | D648 | ° F. (annealed) | 206 |
| Vicat softening point | D1525 | ° F. | 215 |
| Specific gravity | D792 | Gr./cc. | 1.04 |
| Hardness, Rockwell | D785 | R | 109 |
| Color | | | (1) |

1 Light ivory.

Using the preferred embodiment of the invention many types of products are capable of being successfully rotationally cast from ABS. Among these items are: table legs, refrigerator doors, toy animals, automotive sun visors, snow blower augers and photographic developing tanks.

EXAMPLE 1

One hundred fifty grams of random size ABS beads are coated with 1% calcium stearate and introduced into a rotational mold for a one quart oil can. The mold is then attached to a machine for rotational casting. The machine is then rotated at a maximum dimension of 48 inches. The major axis is rotated at a speed of 8 r.p.m. and the minor axis is rotated at a speed of 10 r.p.m. The rotating mold is then placed in an oven at 650° F., for a period of 6.5 minutes. The rotating mold is then removed from the oven and placed into a cooling zone for cooling by water spray for a period of 6.5 minutes. The mold is then opened. The oil can has a satisfactory appearance except for "puddling" at the corners of the mold. The oil can has good impact resistance and a smooth surface.

EXAMPLE 2

One hundred fifty grams of ABS beads are introduced into a one quart oil can mold following the procedures of Example 1 except all ABS beads falling outside of mesh size range 30 to 80 are eliminated. The oil can form has good impact resistance, good adhesion for finishes, good solvent resistance to solvents commonly used in the furniture industry, and "puddling" is reduced.

EXAMPLE 3

One hundred grams of ABS beads having particle size below 600 microns are coated with 1% calcium stearate and introduced into a toy animal mold. The mold is rotated at a speed of 8 r.p.m. along the major axis arm and 10 r.p.m. along the minor axis arm. The rotating mold is placed in an oven at a temperature of 750° for 7 minutes and is then cooled for a period of 5 minutes. The mold is opened and the shaped article is removed. The toy animal shows good detail and has a smooth surface, has good impact resistance and has good adhesion for finishes and resistance to solvents commonly used in surface decorating.

EXAMPLE 4

A table leg is made in a table leg mold following the procedures of Example 1 except the oven time is 13 minutes at 600° F., cooling time is 8 minutes, the beads are coated with 1% NN' ethylene bis stearamide rather than with calcium stearate and the screen analysis of the ABS beads indicates that 83% of the beads will pass through a 40 mesh screen. The table leg produced from this ABS composition has good material distribution and strength. The leg shows good adhesion for coatings and shows superior chemical resistance when placed in contact with solvents commonly used in surface decorating. The leg can be fabricated using all the techniques usually used in the furniture industry such as nailing and sawing. The surface of the products using NN' ethylene bis stearamide instead of calcium stearate as a processing aid has lighter color; however, the surface is slightly more brittle.

What is claimed is:

1. A composition comprising acrylonitrile-butadiene-styrene polymer beads having a particle size smaller than about 600 microns coated with from about 0.25% to about 2% of NN' ethylene bis stearamide.

2. A process for rotationally casting a composition including an acrylonitrile-butadiene-styrene polymer comprising:
   (a) loading said composition comprising acrylonitrile-butadiene-styrene polymer beads coated with from about 0.25% to about 2% of the lubricant NN' ethylene bis stearamide into a mold, said beads having a particle size smaller than about 600 microns,
   (b) heating said composition while said mold is being biaxially rotated and until said composition is distributed evenly upon the walls of said mold,
   (c) continuing the biaxial rotation of said mold and cooling said composition until said composition congeals upon the surface of the walls of said mold forming an acrylonitrile-butadiene-styrene article, and
   (d) removing said acrylonitrile-butadiene-styrene article from said mold.

3. An article rotationally cast from a composition comprising acrylonitrile-butadiene-styrene polymer and from about 0.25 percent to about 2 percent of the lubricant NN' ethylene bis stearamide, said article having good adhesion for finishes commonly used in the furniture industry, resistance to most of the solvents used in the furniture industry, a smooth surface, good mold reproduction and the ability to withstand nailing, drilling and sawing.

References Cited

UNITED STATES PATENTS

| 2,658,051 | 11/1953 | Signer et al. | 260—32.6 |
| 2,884,392 | 4/1959 | Clark et al. | 260—32.6 |
| 2,939,898 | 6/1960 | Aron | 260—23.7 |
| 3,006,903 | 10/1961 | Haefner | 260—92.8 |
| 3,172,160 | 3/1965 | Woodhouse | 264—310 |
| 3,202,745 | 8/1965 | Ringdal | 264—310 |
| 3,367,997 | 2/1968 | Smith | 260—23.7 |
| 3,406,136 | 10/1968 | Scarso et al. | 260—23.7 |
| 3,090,763 | 5/1963 | Hillier | 260—23 |

FOREIGN PATENTS

| 14,663 | 8/1966 | Japan | 260—23.7 |

OTHER REFERENCES

Wilson, British Compounding Ingredients, Heffer & Sons, Ltd., Cambridge, England, 1958, p. 435.

Rubber World Editors, Compounding Ingredients for Rubber, third edition, 1961, Cuneo Press of New England, Cambridge, Mass., pp. 172, 243, and 248.

Chemical Abstracts, vol. 63, 1965, p. 8573h.

Chemical Abstracts, vol. 64, 1966, p. 6914b.

Chemical Abstracts, vol. 66, 1967, p. 116220p.

M. J. WELSH, Primary Examiner

R. W. GRIFFIN, Assistant Examiner

U.S. Cl. X.R.

260—23.7 M, 32.6 A; 264—310